P. A. WHITNEY.
CHUCK.
APPLICATION FILED DEC. 27, 1904.

902,191.

Patented Oct. 27, 1908.

Witnesses:
Mollie L. Burke
D. H. Kriemendahl

Inventor.
Pardon A. Whitney
by J. E. Starr
his attorney

THE NORRIS PETERS CO., WASHINGTON, D. C.

UNITED STATES PATENT OFFICE.

PARDON A. WHITNEY, OF SOUTHINGTON, CONNECTICUT, ASSIGNOR TO PECK, STOW & WILCOX COMPANY, OF SOUTHINGTON, CONNECTICUT, A CORPORATION OF CONNECTICUT.

CHUCK.

No. 902,191.     Specification of Letters Patent.     Patented Oct. 27, 1908.

Application filed December 27, 1904. Serial No. 238,317.

*To all whom it may concern:*

Be it known that I, PARDON A. WHITNEY, a citizen of the United States of America, residing at Southington, in the county of Hartford and State of Connecticut, have invented certain new and useful Improvements in Chucks, of which the following is a specification.

This invention relates to chucks in general and more particularly to those adapted for use with bit-braces.

The object of the invention is to improve devices of the class specified and relates particularly to means for closing the jaws onto the tool-shank.

Figure 1:
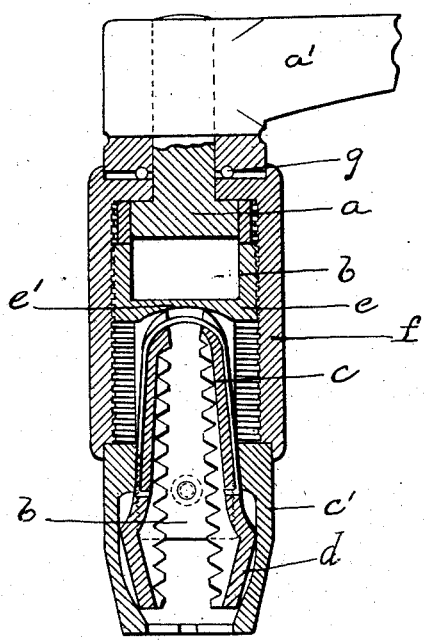
Figure 2:
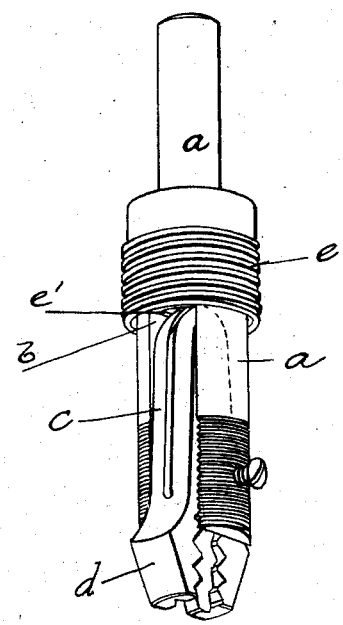
Figure 3:
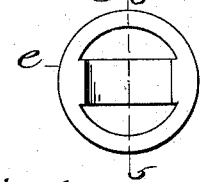
Figure 4:
Figure 4A:
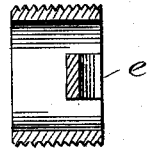

Referring to the drawings—Figure 1 is a central vertical section of a chuck embodying my invention. Fig. 2 is a perspective view of the spindle the sliding nut and the jaws. Fig. 3 is a plan view of the follower. Fig. 4 is a side view thereof. Fig. 4A is a sectional view on the line 5—5 of Fig. 3.

Referring to the drawings $a$ denotes the spindle which may be secured in any desired manner to the driving member as the head $a'$ of a brace sweep. The spindle is slotted as at $b$ to receive the jaws $c$ and there is secured to its lower end the conical body member $c'$ having converging slots to receive the beveled ends of the jaws $d$. A follower $e$ free to slide lengthwise of the spindle carries a web $e'$ which fits in the slot in the spindle and is slightly recessed to receive the inner ends of the jaws. A sleeve $f$ is interiorly threaded to fit the threads on this nut. This sleeve at its rear end has an anti-friction thrust bearing $g$ which prevents its lengthwise movement with respect to the spindle while the jaws are being closed.

The operation of the device will be readily understood. Assuming the jaws to be in wide open position, the rotation of the sleeve $f$ will cause the nut to travel forward carrying the jaws forward and crowding them out through the open end of the body $c'$, the anti-friction thrust bearing at the rear of the sleeve practically eliminating any friction due to the rotary motion of the parts and consequently leaving the entire force of the threads effective for crowding the jaws through the body and firmly closing them onto the tool shank.

The device is simple in construction and operation and extremely effective for holding tools of any kind or size.

I claim as my invention:

In a device of the character described a slotted spindle, jaws located in said slot, a non-rotatable jaw closing body fixedly secured to the end of said spindle, an annular follower surrounding said spindle and adapted for lengthwise movement with respect thereto, threads on the exterior of said follower, a web extending diametrically across one end of said follower adapted to fit in said slot in the spindle and receive the inner end of said jaws, a sleeve surrounding said spindle rotatable with respect thereto and held against longitudinal movement, threads on the interior wall of said sleeve engaging with the threads on the follower, and an anti-friction thrust bearing for the rear end of said sleeve, all substantially as described and for the purposes set forth.

In testimony whereof I affix my signature in presence of two witnesses.

PARDON A. WHITNEY.

Witnesses:
MICHAEL H. GILL,
THOMAS F. WELCH.